United States Patent
Ragland et al.

(10) Patent No.: US 12,351,271 B2
(45) Date of Patent: Jul. 8, 2025

(54) BIKE FRAME HAVING A DRIVE MODULE ENCLOSURE

(71) Applicant: StaCyc, LLC, Fort Worth, TX (US)

(72) Inventors: Robert Ryan Ragland, Brock, TX (US); Lawrence Michael Paige, Springtown, TX (US); Monibert Narito Gaba, Sherwood, OR (US); Jamie Richard Beckett, Aledo, TX (US)

(73) Assignee: StaCyc, LLC, Fort Worth, TX (US)

( * ) Notice: Subject to any disclaimer, the term of this patent is extended or adjusted under 35 U.S.C. 154(b) by 0 days.

(21) Appl. No.: 18/626,828

(22) Filed: Apr. 4, 2024

(65) Prior Publication Data

US 2024/0246632 A1    Jul. 25, 2024

Related U.S. Application Data

(63) Continuation of application No. 18/173,509, filed on Feb. 23, 2023, now Pat. No. 11,975,799, which is a
(Continued)

(51) Int. Cl.
*B62M 7/02* (2006.01)
*B62J 43/16* (2020.01)
(Continued)

(52) U.S. Cl.
CPC ............... *B62M 7/02* (2013.01); *B62J 43/16* (2020.02); *B62K 11/04* (2013.01); *B62K 19/34* (2013.01); *B62M 9/02* (2013.01)

(58) Field of Classification Search
CPC ........... B62M 6/40; B62M 6/55; B62K 19/34; B62K 2204/00
See application file for complete search history.

(56) References Cited

U.S. PATENT DOCUMENTS 3,841,428 A   10/1974  Bialek
4,325,565 A    4/1982  Winchell
(Continued)

FOREIGN PATENT DOCUMENTS

AT           15420 U1    8/2017
CN        201049678 Y    4/2008
(Continued)

OTHER PUBLICATIONS

"OSET Bikes" Oct. 9, 2015, <http://www.osetbikes.com/us> Accessed Feb. 24, 2016.
(Continued)

*Primary Examiner* — James A English
*Assistant Examiner* — Hosam Shabara
(74) *Attorney, Agent, or Firm* — Michael Best & Friedrich LLP

(57) ABSTRACT

A bike includes a frame having a front fork rotatably engaged with a front wheel, a rear fork rotatably engaged with a rear wheel, a handlebar supported for steering the bike, and a drive module configured to drive the rear wheel of the bike when operated selectively with power. The frame includes a down tube extending downward and rearward from the front end of the bike and a drive module enclosure formed at a second end of the down tube and defining a drive module receptacle to receive the drive module. An alignment structure is positioned between the drive module and the inner surface of the drive module enclosure. The drive module is positioned within the drive module receptacle to form an engagement between the alignment structure and the drive module to support a first portion the drive module within the drive module receptacle.

18 Claims, 11 Drawing Sheets

Related U.S. Application Data continuation of application No. 17/192,509, filed on Mar. 4, 2021, now Pat. No. 11,603,165.

(51) Int. Cl.
    *B62K 11/04*      (2006.01)
    *B62K 19/34*      (2006.01)
    *B62M 9/02*      (2006.01)

(56) References Cited

U.S. PATENT DOCUMENTS

| | | |
|---|---|---|
| RE32,031 E | 11/1985 | Winchell |
| 5,090,715 A | 2/1992 | Nakajima |
| 5,915,493 A | 6/1999 | Nakayama |
| 6,012,538 A | 1/2000 | Sonobe et al. |
| 6,039,137 A | 3/2000 | Schless |
| 6,095,270 A | 8/2000 | Ishikawa |
| 6,276,479 B1 | 8/2001 | Suzuki et al. |
| 6,655,705 B2 | 12/2003 | Turgeon |
| 6,880,661 B1 | 4/2005 | Oh |
| 7,513,520 B2 | 4/2009 | Okuyama |
| D629,049 S | 12/2010 | McFarland |
| 7,997,604 B2 | 8/2011 | Griep et al. |
| 8,414,007 B2 | 4/2013 | Chen |
| 8,617,730 B2 | 12/2013 | Tsukamoto et al. |
| 8,672,077 B2 | 3/2014 | Sand et al. |
| 8,881,857 B2 | 11/2014 | Binggeli et al. |
| 8,967,641 B2 | 3/2015 | De Roeck |
| 9,120,532 B2* | 9/2015 | Huang .................. B62K 19/30 |
| 9,193,411 B2 | 11/2015 | Sand et al. |
| 9,403,574 B2 | 8/2016 | Sand et al. |
| D774,971 S | 12/2016 | Lambri et al. |
| 9,580,141 B2 | 2/2017 | Talavasek et al. |
| 9,616,966 B2 | 4/2017 | Talavasek et al. |
| 9,777,774 B2 | 10/2017 | Biechele |
| 9,937,975 B2 | 4/2018 | Ragland et al. |
| 10,518,841 B2 | 12/2019 | Talavasek et al. |
| 10,696,355 B2 | 6/2020 | Talavasek et al. |
| 10,730,584 B2 | 8/2020 | Ragland et al. |
| 10,850,805 B1 | 12/2020 | Noda et al. |
| 10,906,609 B2 | 2/2021 | Talavasek et al. |
| 10,906,610 B2 | 2/2021 | Talavasek et al. |
| D918,781 S | 5/2021 | Hüttl et al. |
| D919,484 S | 5/2021 | Von Schöning et al. |
| 11,046,389 B2 | 6/2021 | Talavasek et al. |
| D924,733 S | 7/2021 | Lin |
| 11,117,634 B2 | 9/2021 | Talavasek et al. |
| 11,124,259 B2 | 9/2021 | Talavasek et al. |
| 11,161,567 B2 | 11/2021 | Eguchi |
| 11,242,106 B2 | 2/2022 | Chen et al. |
| 11,345,437 B2 | 5/2022 | Talavasek et al. |
| D962,828 S | 9/2022 | Chen |
| D972,459 S | 12/2022 | Wen |
| D975,598 S | 1/2023 | Gray et al. |
| 11,603,165 B2 | 3/2023 | Ragland et al. |
| D1,005,891 S | 11/2023 | Li |
| 11,975,799 B2* | 5/2024 | Ragland .................. B62M 6/40 |
| D1,029,695 S | 6/2024 | Yi |
| D1,031,527 S | 6/2024 | Li |
| D1,031,531 S | 6/2024 | Lin |
| D1,032,416 S | 6/2024 | Zhang et al. |
| D1,043,450 S | 9/2024 | Horuz |
| 2002/0046891 A1 | 4/2002 | Honda et al. |
| 2005/0087379 A1 | 4/2005 | Holland |
| 2005/0140115 A1 | 6/2005 | Francis et al. |
| 2009/0161903 A1 | 6/2009 | White |
| 2010/0052287 A1 | 3/2010 | McFarland |
| 2010/0148460 A1 | 6/2010 | Nelson et al. |
| 2010/0175942 A1 | 7/2010 | Griep et al. |
| 2010/0206652 A1 | 8/2010 | Kielland |
| 2011/0124454 A1 | 5/2011 | Song |
| 2011/0284303 A1 | 11/2011 | Shwartz |
| 2012/0000724 A1 | 1/2012 | Mimura et al. |
| 2012/0234636 A1 | 9/2012 | McFarland |
| 2013/0020777 A1 | 1/2013 | Chen |
| 2013/0032425 A1 | 2/2013 | Lee et al. |
| 2013/0081894 A1 | 4/2013 | Ishikawa et al. |
| 2013/0177196 A1 | 7/2013 | Lee |
| 2013/0231810 A1 | 9/2013 | Garcia |
| 2013/0288841 A1 | 10/2013 | Yoshino et al. |
| 2014/0076097 A1 | 3/2014 | Stewart |
| 2014/0077470 A1 | 3/2014 | Chen |
| 2014/0319907 A1 | 10/2014 | Yamazaki |
| 2014/0336858 A1 | 11/2014 | Matsushima et al. |
| 2014/0379209 A1 | 12/2014 | Matsuda |
| 2016/0297499 A1 | 10/2016 | Ohashi et al. |
| 2017/0088013 A1 | 3/2017 | Shimizu et al. |
| 2018/0029497 A1 | 2/2018 | Shieh |
| 2018/0072380 A1* | 3/2018 | Talavasek .............. B62K 25/28 |
| 2018/0327040 A1 | 11/2018 | Spicer |
| 2019/0039677 A1 | 2/2019 | Noda et al. |
| 2019/0039687 A1 | 2/2019 | Lay et al. |
| 2019/0112000 A1* | 4/2019 | Noda .................. B62M 6/55 |
| 2020/0062325 A1 | 2/2020 | Talavasek et al. |
| 2020/0062329 A1 | 2/2020 | Talavasek et al. |
| 2020/0062339 A1 | 2/2020 | Talavasek et al. |
| 2020/0062341 A1 | 2/2020 | Talavasek et al. |
| 2020/0062342 A1 | 2/2020 | Talavasek et al. |
| 2020/0079471 A1 | 3/2020 | Eguchi |
| 2020/0247501 A1 | 8/2020 | Kameda et al. |
| 2020/0247502 A1 | 8/2020 | Mitsuyasu et al. |
| 2020/0354019 A1 | 11/2020 | Ragland et al. |
| 2020/0385080 A1 | 12/2020 | Chen et al. |
| 2021/0269118 A1 | 9/2021 | Nishimori et al. |
| 2021/0269119 A1 | 9/2021 | Boehnke et al. |
| 2021/0380192 A1 | 12/2021 | Demond |
| 2022/0281552 A1 | 9/2022 | Liao |
| 2022/0306240 A1* | 9/2022 | Talavasek .............. B62J 45/423 |
| 2023/0062161 A1 | 3/2023 | Wakuta |

FOREIGN PATENT DOCUMENTS

| | | |
|---|---|---|
| CN | 201086768 Y | 7/2008 |
| CN | 102390468 A | 3/2012 |
| CN | 102447085 A | 5/2012 |
| CN | 103303400 A | 9/2013 |
| CN | 103359253 A | 10/2013 |
| CN | 203581244 U | 5/2014 |
| CN | 210083435 U | 2/2020 |
| DE | 102011079094 A1 | 7/2012 |
| DE | 202012104843 U1 | 1/2013 |
| DE | 202016102118 U1 | 8/2017 |
| DE | 202017003772 U1 | 8/2017 |
| DE | 202016104758 U1 | 12/2017 |
| DE | 202017004040 U1 | 11/2018 |
| DE | 102017006574 A1 | 1/2019 |
| DE | 202019106361 U1 | 1/2020 |
| DE | 102020100712 A1 | 8/2020 |
| DE | 102020100724 A1 | 8/2020 |
| DE | 102020134352 A1 | 7/2021 |
| EP | 1092826 A1 | 4/2001 |
| EP | 2230164 B1 | 5/2012 |
| EP | 2957494 A1 | 12/2015 |
| EP | 3109145 A1 | 12/2016 |
| EP | 2731858 B1 | 1/2017 |
| EP | 2739522 B1 | 9/2017 |
| EP | 3437977 A1 | 2/2019 |
| EP | 3109146 B1 | 9/2019 |
| EP | 3191361 B1 | 9/2019 |
| EP | 3620362 A1 | 3/2020 |
| FR | 3064242 A1 | 9/2018 |
| FR | 3065704 A1 | 11/2018 |
| GB | 2511522 A | 9/2014 |
| JP | 2019031263 A | 2/2019 |
| NL | 2021658 B1 | 5/2020 |
| TW | M581557 U | 8/2019 |
| TW | M582478 U | 8/2019 |
| WO | 2013050193 A1 | 4/2013 |
| WO | 2013150411 A1 | 10/2013 |
| WO | 2016206731 A1 | 12/2016 |
| WO | 2018042269 A1 | 3/2018 |
| WO | 2020007496 A1 | 1/2020 |

(56) References Cited

FOREIGN PATENT DOCUMENTS

| WO | 2020041425 A1 | 2/2020 |
|---|---|---|
| WO | 2020097637 A1 | 5/2020 |
| WO | 2022172776 A1 | 8/2022 |

OTHER PUBLICATIONS

"Kuberg Start" Oct. 9, 2015, < http://www.kuberg.com/p-2-start. aspx/> I\ccessed Feb. 24, 2016.
"MX650—Dirt Rides, Supercross Inspired" Oct. 9, 2015, < http://www.razor.com/products/dirt/mx650/> Accessed Feb. 24, 2016.
"Strider Bikes—We love inspiring kids to ride" Oct. 9, 2015, < http://www.striderbikes.com> Accessed Feb. 24, 2016.
"Pro Mini 12" I Muna Bikes Oct. 9, 2015, < http://www.munabikes.com/index.php/boys-bikes/pro-mini-12> \ccessed Feb. 24, 2016.
"Hyper Motorbike Boys' 36-Volt Electric Bike—Walmart.com" Oct. 9, 2015, < http://www.walmart.com/ip/Hyper-Motobike-Boys-36-Volt-Electric-Bike/23149110> Accessed Feb. 24, 2016.
"Electric strider—YouTube" Oct. 9, 2015, < http://www.youtube.com/watch?v=hDwzR6nBsns> Accessed Feb. 24, 2016.
ZhuMin, "Metalworking Practice 2nd Edition", Chengdu: Southwest Jiaotong University Press, Jan. 2012 (pp. 173-175 with English Translation).
International Search Report with Written Opinion for related Application No. PCT/US2021/062406 dated Mar. 8, 2022 (14 Pages).

\* cited by examiner

BIKE FRAME HAVING A DRIVE MODULE ENCLOSURE

CROSS-REFERENCE TO RELATED APPLICATIONS

This application is a continuation of co-pending U.S. patent application Ser. No. 18/173,509, filed on Feb. 23, 2023, which is a continuation of U.S. patent application Ser. No. 17/192,509, filed Mar. 4, 2021, the entire contents of which are incorporated by reference herein.

BACKGROUND

A running bike may be used to train children to properly learn how to balance and control a two wheeled vehicle such as a bicycle or a motorcycle. Running bikes may include a drivetrain assembly (e.g., including an electric motor) that powers the running bike. Running bikes, therefore, allows for the growth of the child's skills from initial balance, to the more complex task of combining balance, throttle control, and braking.

SUMMARY

In one aspect, the invention provides a bike configured for travel along a longitudinal direction. The bike includes a frame elongated in the longitudinal direction, a front fork rotatably engaged with a front wheel at a front end of the bike, a rear fork rotatably engaged with a rear wheel at a rear end of the bike, a handlebar supported with the front fork for rotation at the front end of the bike for steering the bike, and a drive module configured to drive the rear wheel of the bike when operated selectively with power. The frame includes a down tube extending downward and rearward from the front end of the bike. The down tube having a first end positioned proximate the front end of the bike and a second end opposite the first end. The frame also includes a drive module enclosure formed at the second end of the down tube. The drive module enclosure including an inner surface defining a drive module receptacle to receive the drive module. An alignment structure is positioned between the drive module and the inner surface of the drive module enclosure to support the drive module within the drive module receptacle. The drive module is positioned within the drive module receptacle to form an engagement between the alignment structure and the drive module to support a first portion the drive module within the drive module receptacle.

In another aspect, the invention provides a bike configured for travel along a longitudinal direction. The bike includes a frame elongated in the longitudinal direction, a front fork rotatably engaged with a front wheel at a front end of the bike; a rear fork rotatably engaged with a rear wheel at a rear end of the bike, a handlebar supported with the front fork for rotation at the front end of the bike for steering the bike, and a drive module configured to drive the rear wheel of the bike when operated selectively with power. The drive module having a securing structure. The frame includes a down tube extending downward and rearward from the front end of the bike. The down tube having a first end positioned proximate the front end of the bike and a second end opposite the first end. The frame also includes a drive module enclosure formed at the second end of the down tube. The drive module enclosure defining a drive module receptacle to receive the drive module. The frame also includes an attachment structure positioned outside of the drive module enclosure. A fastener coupling the drive module to the attachment structure to secure the drive module within the drive module receptacle.

In another aspect, the invention provides a bike configured for travel along a longitudinal direction. The bike includes a frame elongated in the longitudinal direction, a front fork rotatably engaged with a front wheel at a front end of the bike, a rear fork rotatably engaged with a rear wheel at a rear end of the bike, a handlebar supported with the front fork for rotation at the front end of the bike for steering the bike, and a drive module configured to drive the rear wheel of the bike when operated selectively with power. The frame includes a down tube extending downward and rearward from the front end of the bike. The down tube having a first end positioned proximate the front end of the bike and a second end opposite the first end. The frame also includes a drive module enclosure formed at the second end of the down tube. The drive module enclosure including an inner surface defining a drive module receptacle to receive the drive module. The drive module includes a portion positioned within the drive module receptacle and a securing structure positioned outside the drive module receptacle. The securing structure is configured to couple the drive module to the frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
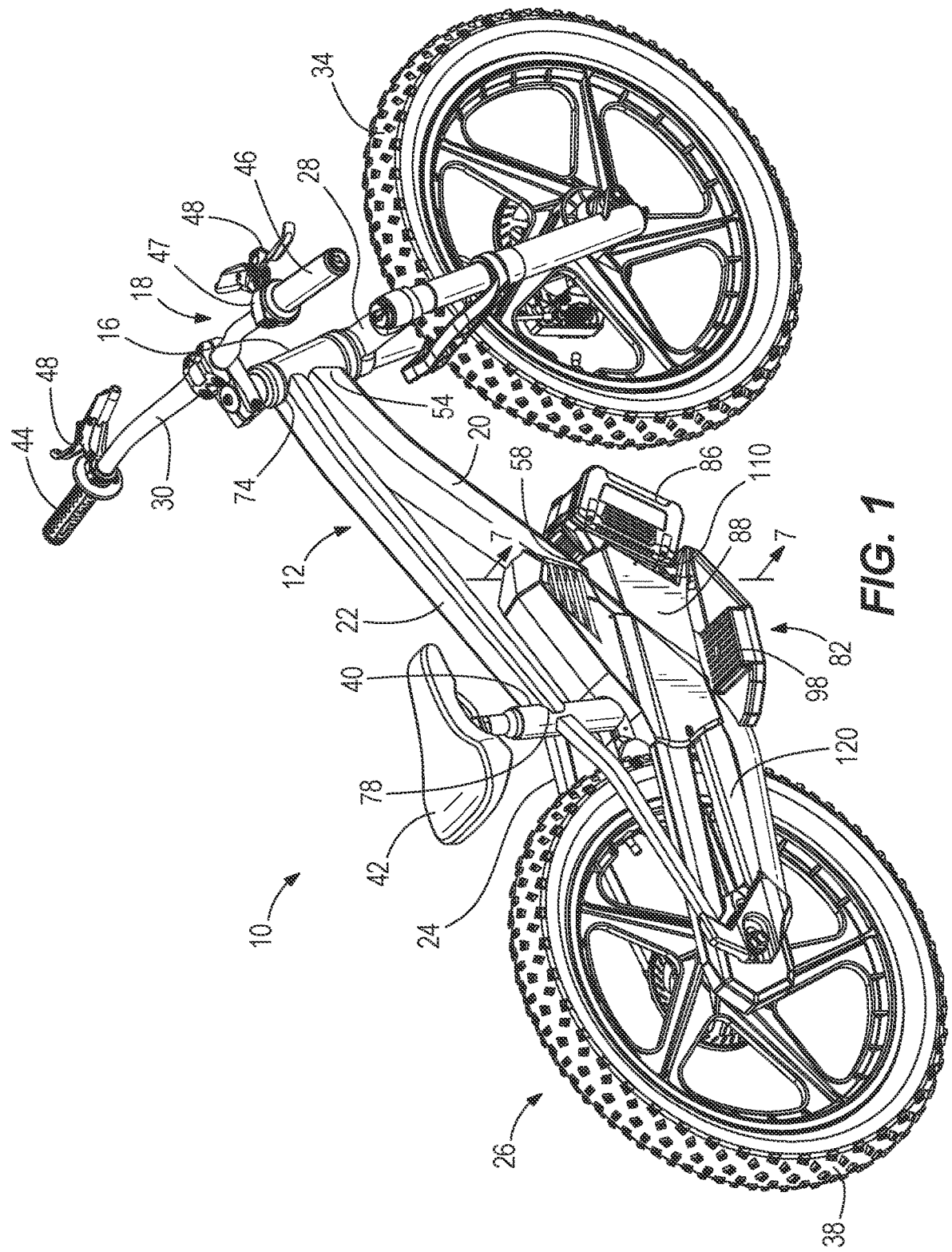
FIG. 1 is a perspective view of a running bike according to an embodiment of the invention.
Figure 2:
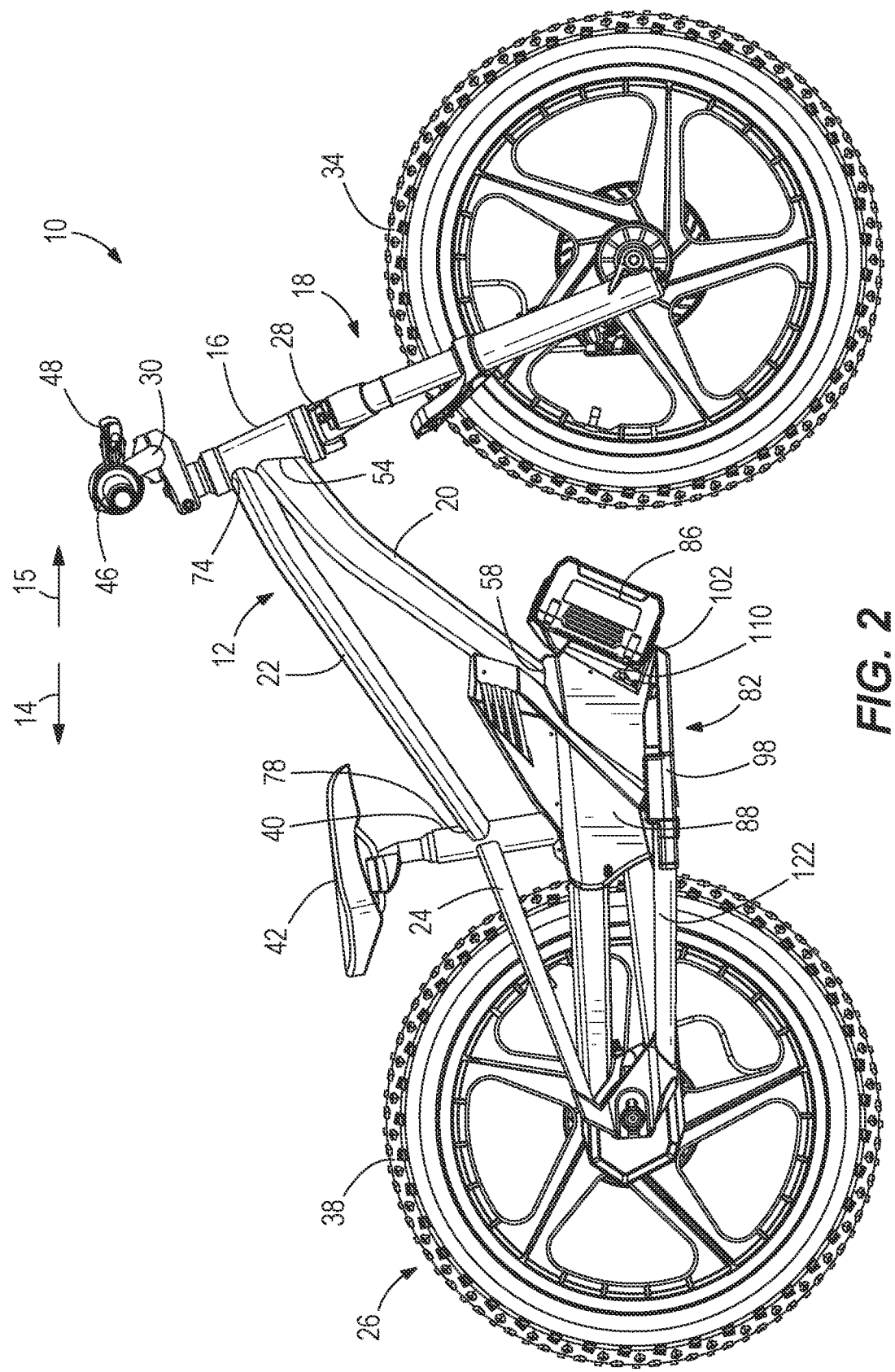
FIG. 2 is a first side view of the running bike of FIG. 1.
Figure 3:
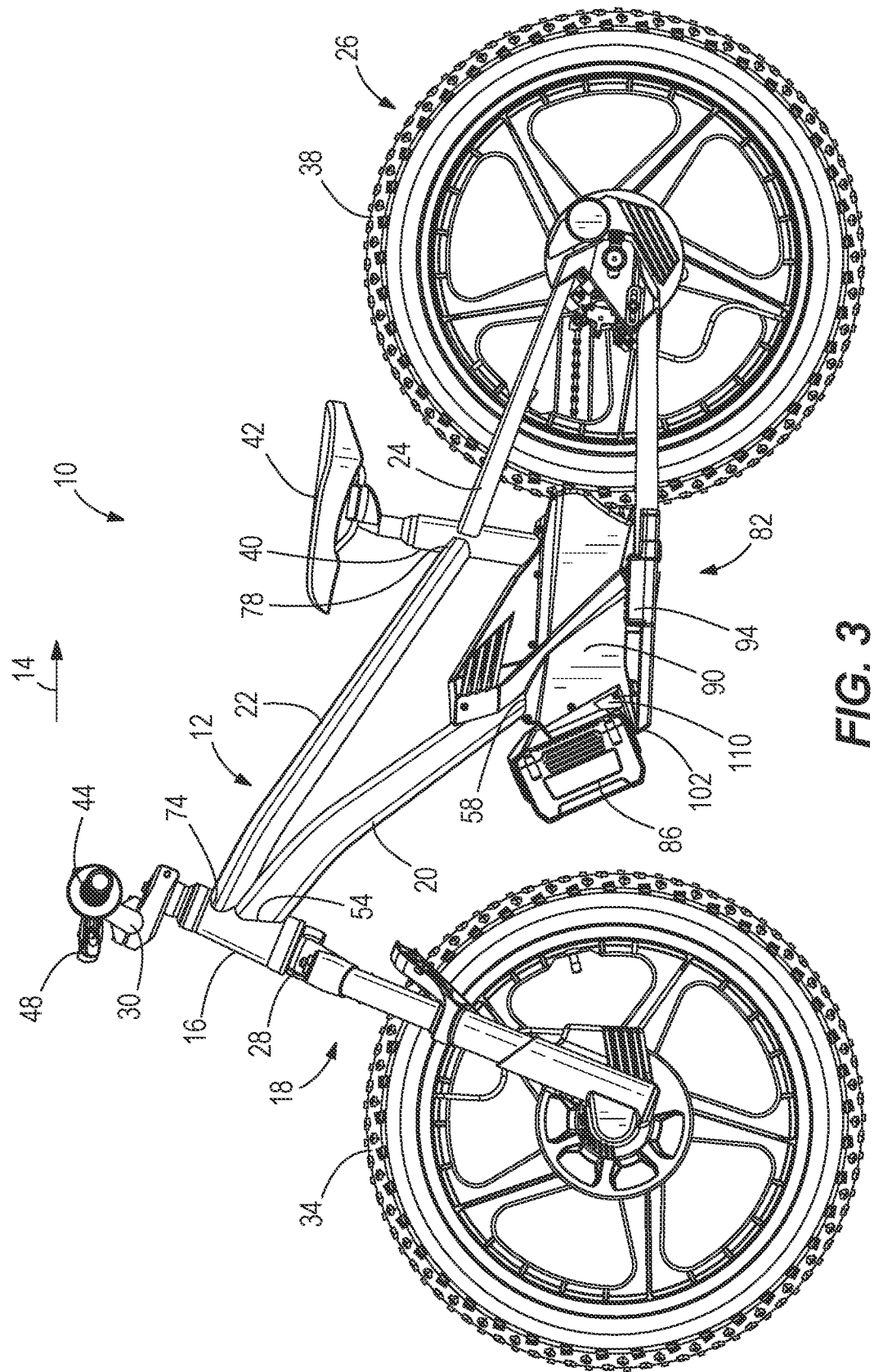
FIG. 3 is a second side view of the running bike of FIG. 1.

FIGS. 1-4 illustrate a bike 10 configured for example as a balance bike or running bike and including a frame 12 elongated in a longitudinal direction. The longitudinal direction can be taken as a front-rear direction 14 of the running bike 10 or the opposing rear-front 15 direction (FIGS. 2 and 3). The frame 12 includes a head tube 16, a down tube 20 extending downward and rearward from the head tube 16, a top tube 22 extending rearward from the head tube 16, and a rear fork 24. The area proximate the head tube 16 defines a front end 18 of the frame 12 and the running bike 10. The area proximate the rear fork 24 defines a rear end 26 of the frame 12 and the running bike 10. The head tube 16 is sized to receive and rotatably support a front fork 28 and a handlebar 30 to steer the bike 10.

A front wheel 34 is rotatably connected to the front fork 28 and a rear wheel 38 is rotatably connected to the rear fork 24. In the illustrated embodiment, the front fork 28 includes a suspension system and the rear fork 24 is a rigid fork. In other embodiments, the front fork 28 may be devoid of the suspension system or the rear fork 24 may include a rear suspension system. A seat tube 40 is positioned between and coupled to the top tube 22 and the rear fork 24. The seat tube 40 is sized to receive a seat 42 that is adjustable relative to the top tube 22 and configured to support an operator on the bike 10.

In the illustrated embodiment, the head tube 16 defines a cylindrical receptacle that houses a set of bearings (not shown) that rotatably support the front fork 28 and the handlebar 30 within the head tube 16. In addition, the front and rear wheels 34, 38 are respectively connected to the front and rear forks 28, 24 by conventional bicycle axle hardware such as nuts, bolts and bearings and are operable to support the running bike 10 relative to the ground.

The handlebar 30 includes left and right grips 44, 46 that may function as a throttle input to a drivetrain assembly 50 (FIG. 11) and brake levers 48 coupled to the handlebar 30 to selectively activate front or rear brake systems. For example, the right grip 46 may be integrated with a throttle sensor 47 so the operator can twist the grip 46 relative to the handlebar 30 in order to adjust the amount of power provided to the drivetrain assembly 50. In other embodiments, alternative throttles may be used such as a thumb lever throttle or the like. While the disclosure is described in terms of a running bike, it should be appreciated that the frame 12 described herein may be used for other bicycles such as an electric bike (e.g., an E-bike).

With continued reference to FIGS. 1-4, the down tube 20 includes a first end 54 connected to the head tube 16 and a second end 58 opposite the first end 54. A drive module enclosure 62 is formed at the second end 58 of the down tube 20. The drive module enclosure 62 defines a drive module receptacle 66 (FIG. 4) open in the longitudinal direction of the running bike 10. In the illustrated embodiment, the drive module receptacle 66 is open in both the front-rear direction 14 and the rear-front direction 15 (FIGS. 2 and 3). The drive module receptacle 66 is sized to receive a drive module 70 of the drivetrain assembly 50. In the illustrated embodiment, the drive module receptable 66 is open exclusively in the longitudinal direction such that the drive module enclosure 62 precludes installation of the drive module 70 from a lateral direction. In the illustrated embodiment, the drive module receptacle is integral with the down tube 20 (e.g., welded together or formed as a single casting) as opposed to being removably secured via fasteners. In other embodiments, the drive module enclosure 62 may be removably attached to the down tube 20. The drive module enclosure 62 forms a tunnel for receiving at least a portion of the drive module 70 when assembled into operational configuration. The drive module enclosure 62 can be open at both front and rear ends thereof. The drive module enclosure 62 includes a top portion coupled to the second end 58 of the down tube 20 and a bottom portion coupled to the rear fork 24.

The down tube 20 includes a curvilinear profile that provides additional clearance between the front wheel 34 and the down tube 20 as compared to a straight line between the ends 54, 58. The top tube 22 has a first end 74 connected to the head tube 16 and a second end 78 coupled to the rear fork 24. In other embodiments, the first end 74 of the top tube 22 may be connected to the down tube 20. In the illustrated embodiment, the down tube 20 and the top tube 22 each have a generally rectangular cross-section profile. In other embodiments, the down tube and/or the top tube 22 may have alternative geometry (e.g., a circular geometry, or the like).

Figure 4:
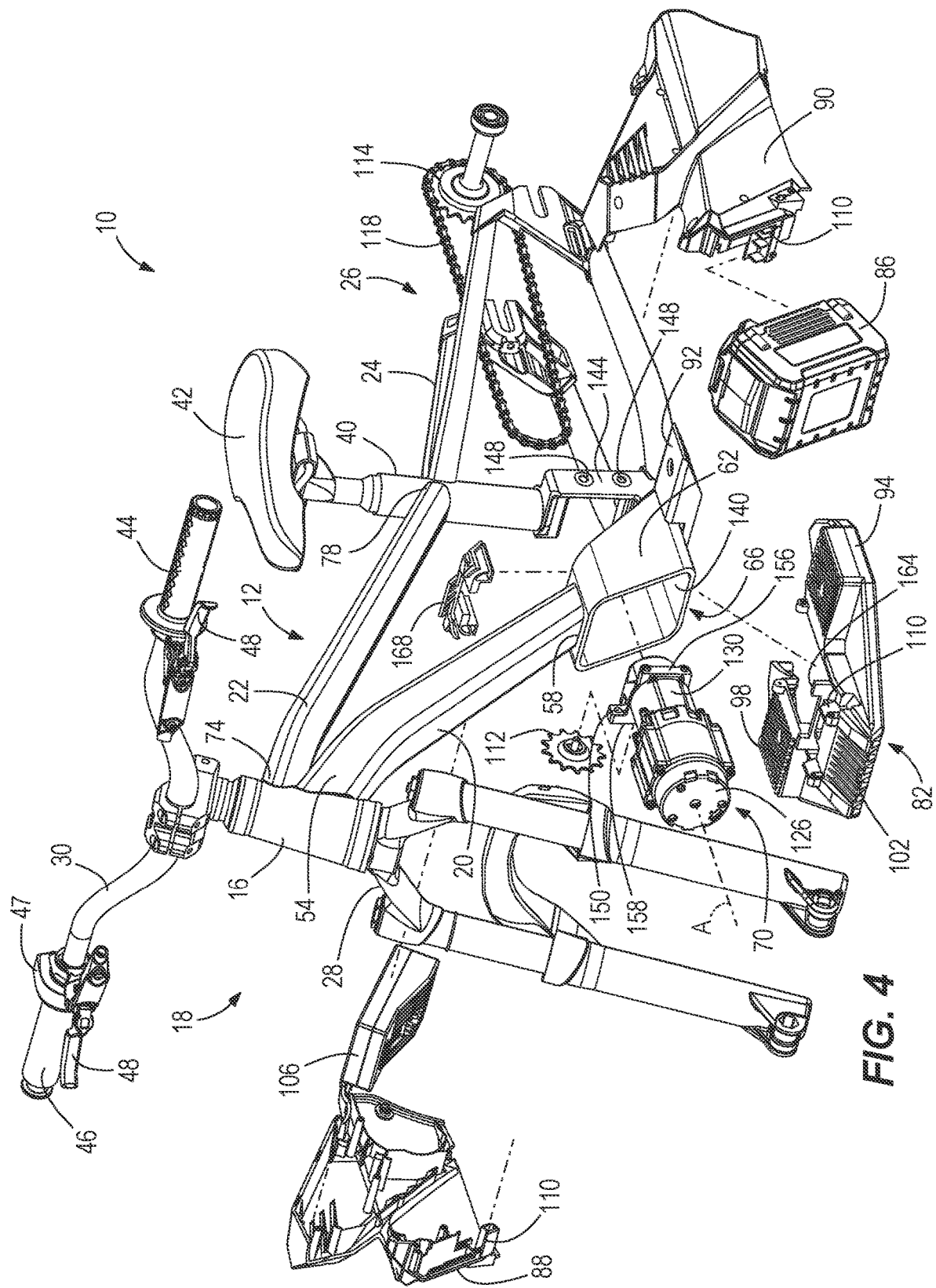
FIG. 4 is a perspective, exploded view of the running bike of FIG. 1

With continued reference to FIG. 4, the running bike 10 further includes a footrest 82 supported by the frame 12 adjacent the drive module enclosure 62, a battery pack 86 supported by the frame 12 adjacent the drive module enclosure 62, and a pair of side panels 88, 90. In the illustrated embodiment, the frame 12 includes support platforms 92 extending outward from the drive module enclosure 62, which support the footrest 82. The running bike 10 has no pedals for manually driving the rear wheel 38. In the illustrated embodiment, the footrest 82 has a substantially U-shaped geometry that surrounds three sides (e.g., left, right, front sides) of the drive module enclosure 62. For example, the footrest includes a left portion 94, a right portion 98, and a front portion 102 connecting the left portion 94 to the right portion 98. The left and right portions 94, 98 each include a recess that is sized to receive a fastener which secures the footrest 82 to the support platforms 92. The support platforms 92 may form an integral part of the frame 12.

The pair of side panels 88, 90 are coupled to the frame 12 to enclose the drive module 70 within the drive module enclosure 62 and support an electronic control module 106. In the illustrated embodiment, the pair of side panels 88, 90 includes a left side panel 90 and a right side panel 88 that connect together. The left and right side panels 90, 88 are coupled to each other and the footrest 82. The combination of the side panels 88, 90 and the front portion 102 of the footrest 82 form a battery mount 110 at respective front ends of the side panels 88, 90. The battery mount 110 supports the battery pack 86, which provides electrical power to the drive module 70 of the drivetrain assembly 50. In some constructions, the battery pack 86 is supported (e.g., by a sliding interface) for selective removal from the battery mount 110 so that the battery pack 86 can be removed for charging or replacement. The battery mount 110 provides both a mechanical interface for the battery pack 86 and an electrical interface for establishing a circuit between the battery pack 86 and the drive module 70 and the electronic control module 106, among other components.

Figure 5:
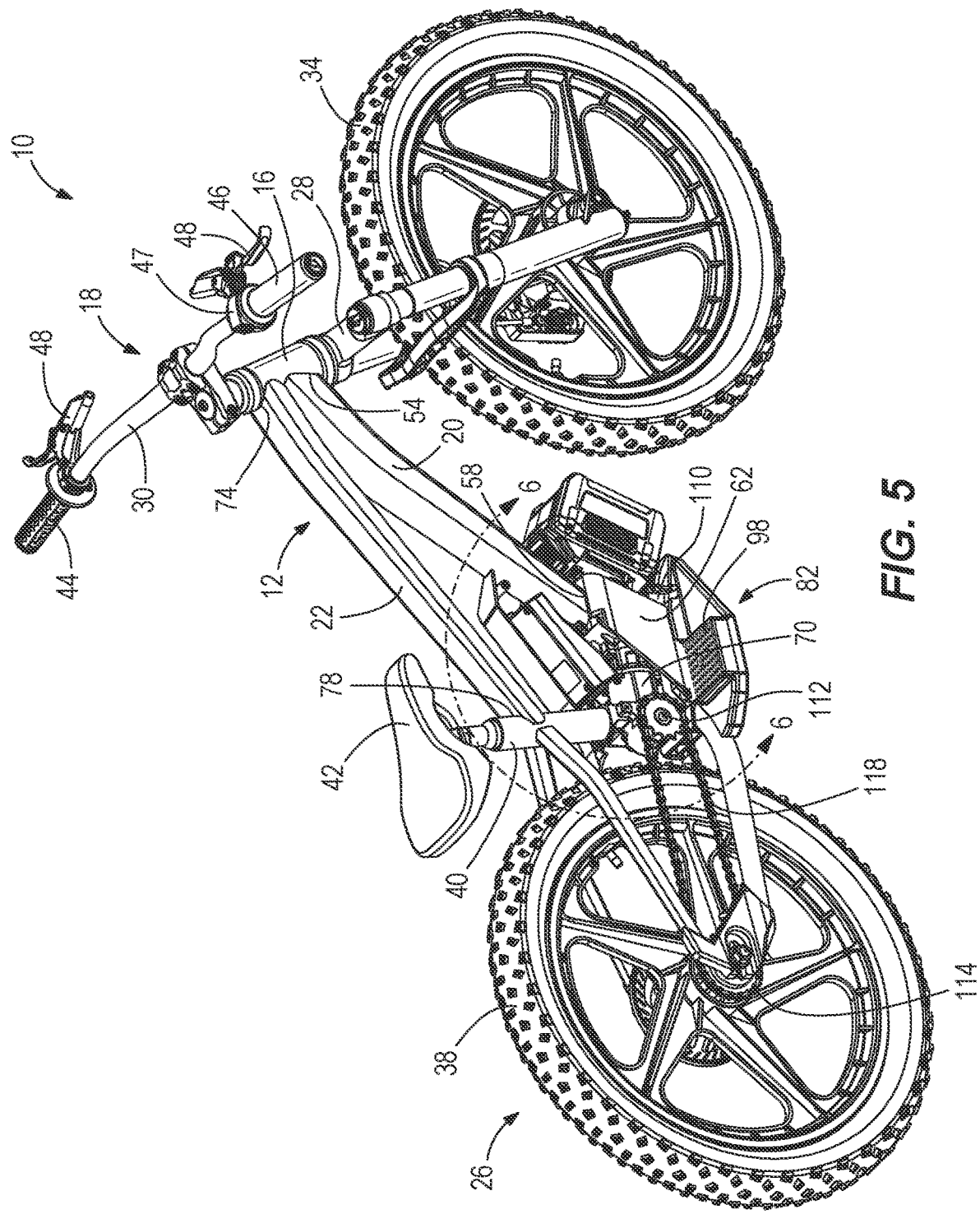
FIG. 5 is another perspective of the running bike of FIG. 1 with a side panel and a chain guard removed to illustrate a drivetrain assembly.
Figure 6:
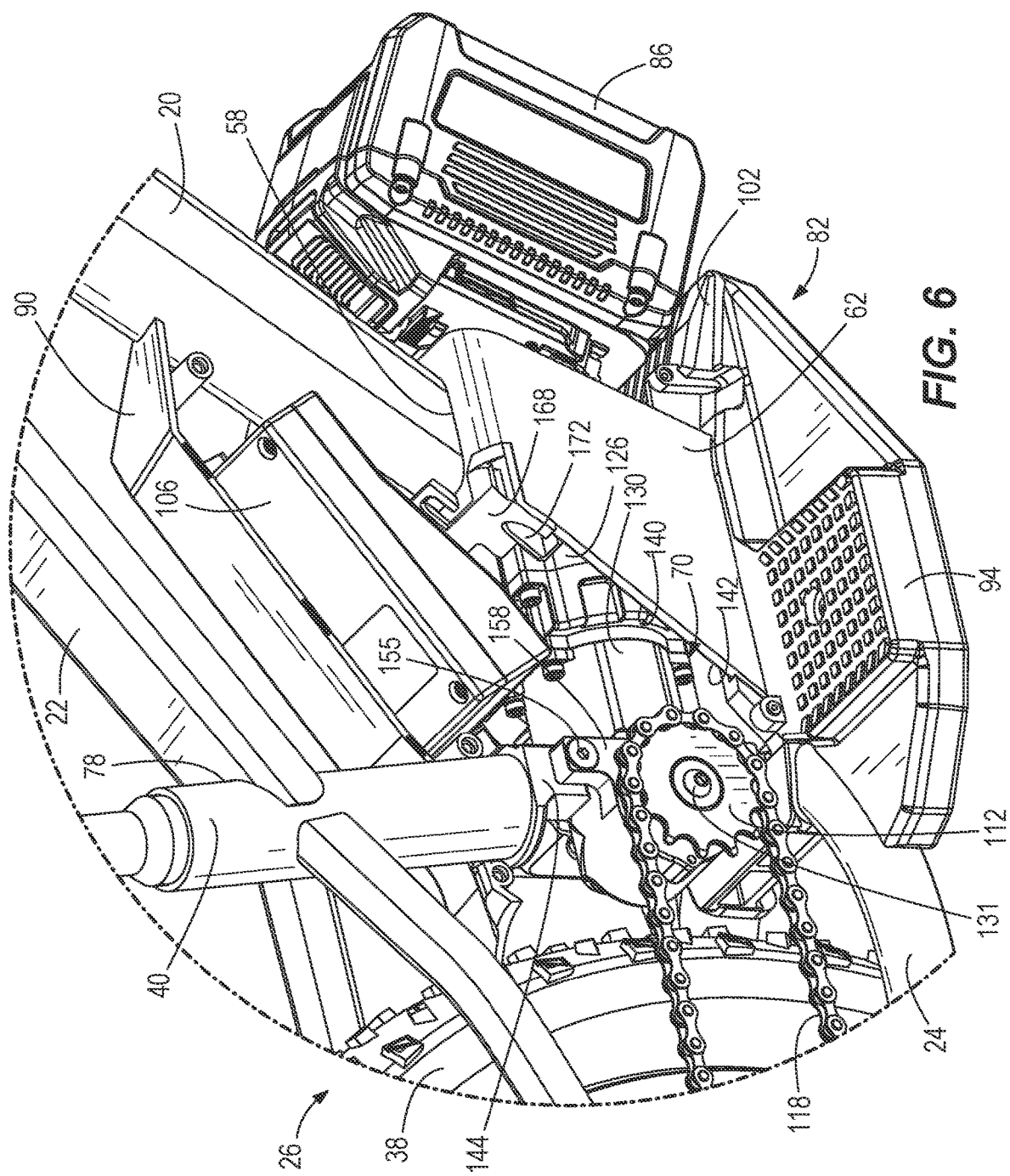
FIG. 6 is perspective view of a portion of the running bike of FIG. 1 illustrating a drive module of the drivetrain assembly positioned within a drive module enclosure.
Figure 11:
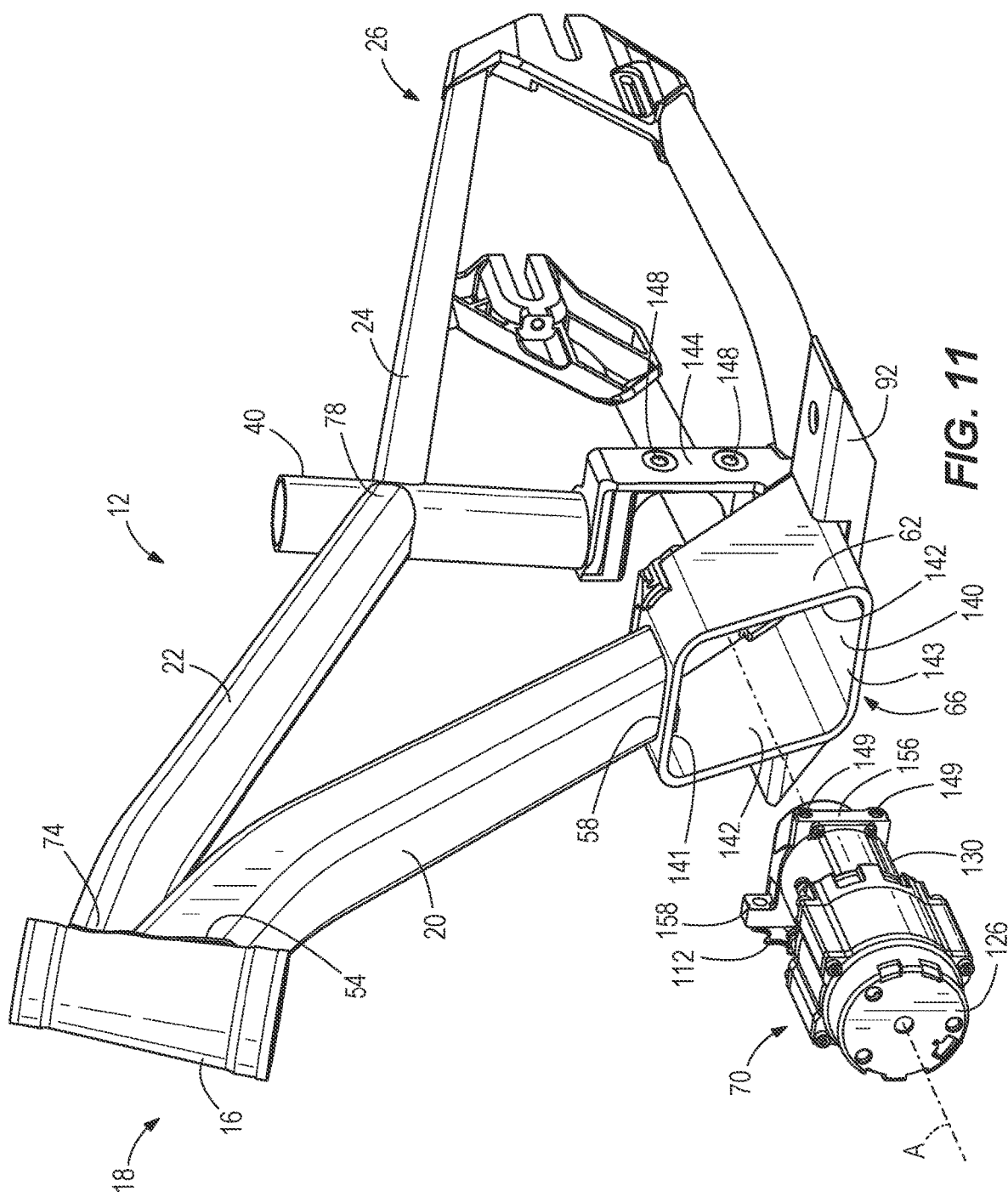
FIG. 11 is perspective view of a frame of the running bike of FIG. 1.
Figure 12:
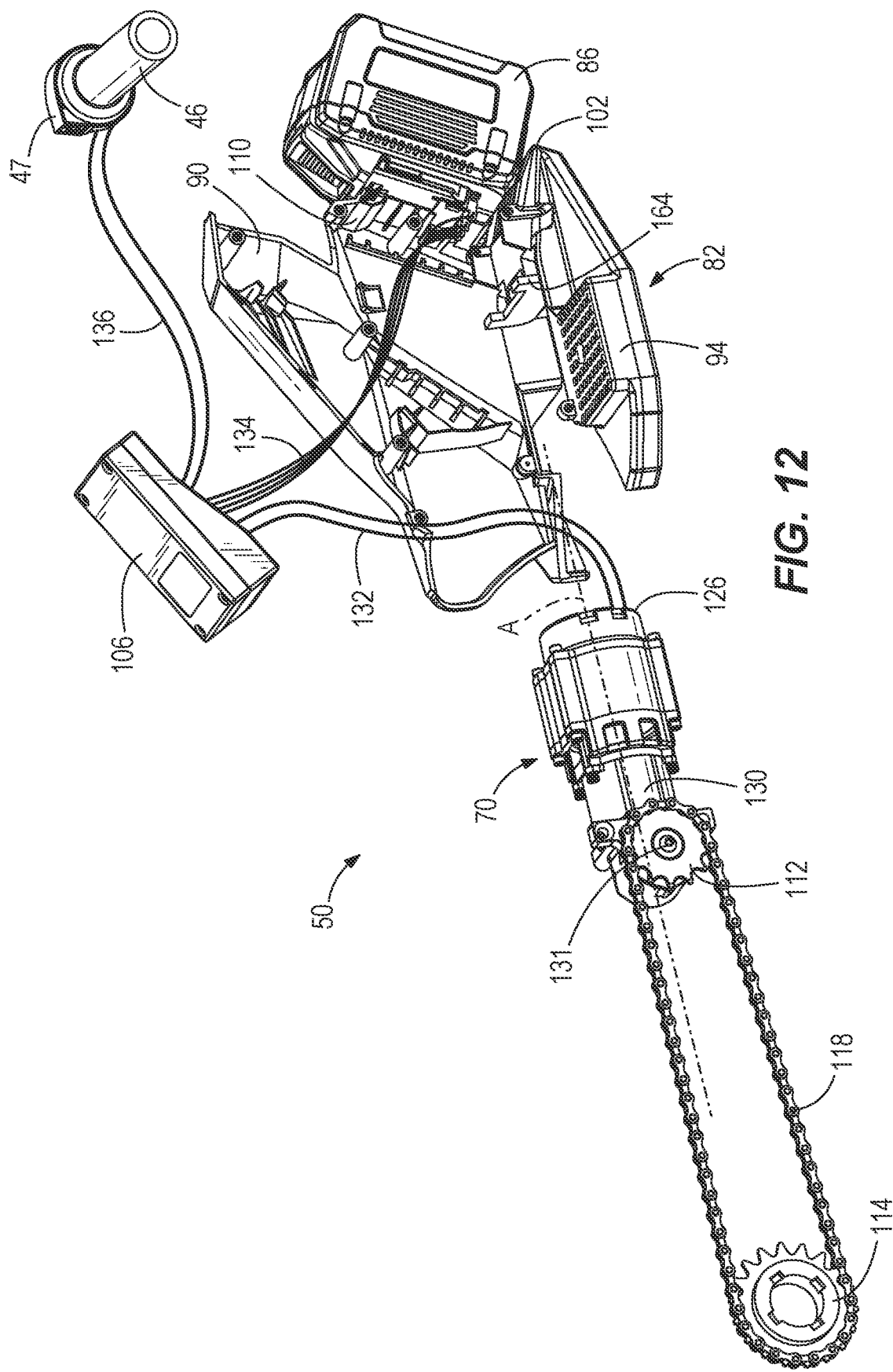
FIG. 12 is a perspective view of the drivetrain assembly and electrical components of the running bike of FIG. 1.

Now with reference to FIGS. 5, 6, and 11, the drivetrain assembly 50 (isolated in FIG. 11) includes the drive module 70 having a first sprocket 112, a second sprocket 114 coupled to the rear wheel 38 (FIG. 5), and a chain 118 extending between the first and second sprockets 112, 114. In the illustrated embodiment, the second sprocket 114 is a free wheel sprocket that freely allows the rear wheel 38 to rotate faster than the second sprocket 114, allowing the running bike 10 to coast when the drive module 70 is not activated. The running bike 10 further includes a chain cover 120 (FIG. 4) that protects the chain 118 to.

Now with reference to FIG. 11, the drive module 70 includes an electric motor 126, a gearbox 130 operably coupled to an output of the electric motor 126, and the first sprocket 112 which is coupled to an output shaft 131 of the gearbox 130 and driven by the electric motor 126. The drive module 70 can define a longitudinal axis A (FIG. 7), which in some constructions can be the central rotational axis of the electric motor 126 and/or gearbox 130. In some constructions, the longitudinal axis A can be parallel to the longitudinal axis of the running bike 10 (e.g., the front-rear direction 14). The drive module 70 is electrically connected to the electronic control module 106, the battery pack 86 and the throttle sensor on the grip 46 via electrical cables 132, 134, 136. The electronic control module 106 receives a signal from the throttle 47 to provide power to the electric motor 126. In the illustrated embodiment, the electric motor 126 is a brushless motor. In other embodiments, the motor may be a brushed motor or other motors of similar function. The gearbox 130 includes a planetary gear reduction and a 90-degree angle drive output shaft 131 that is coupled to the first sprocket 112. While the illustrated drive module 70 includes the electric motor 126, the gearbox 130, and the sprocket 112, it should be appreciated that the drive module 70 may include more or less components, or similar components arranged differently. For example, the drive module 70 may only include the electric motor 126.

Figure 7:
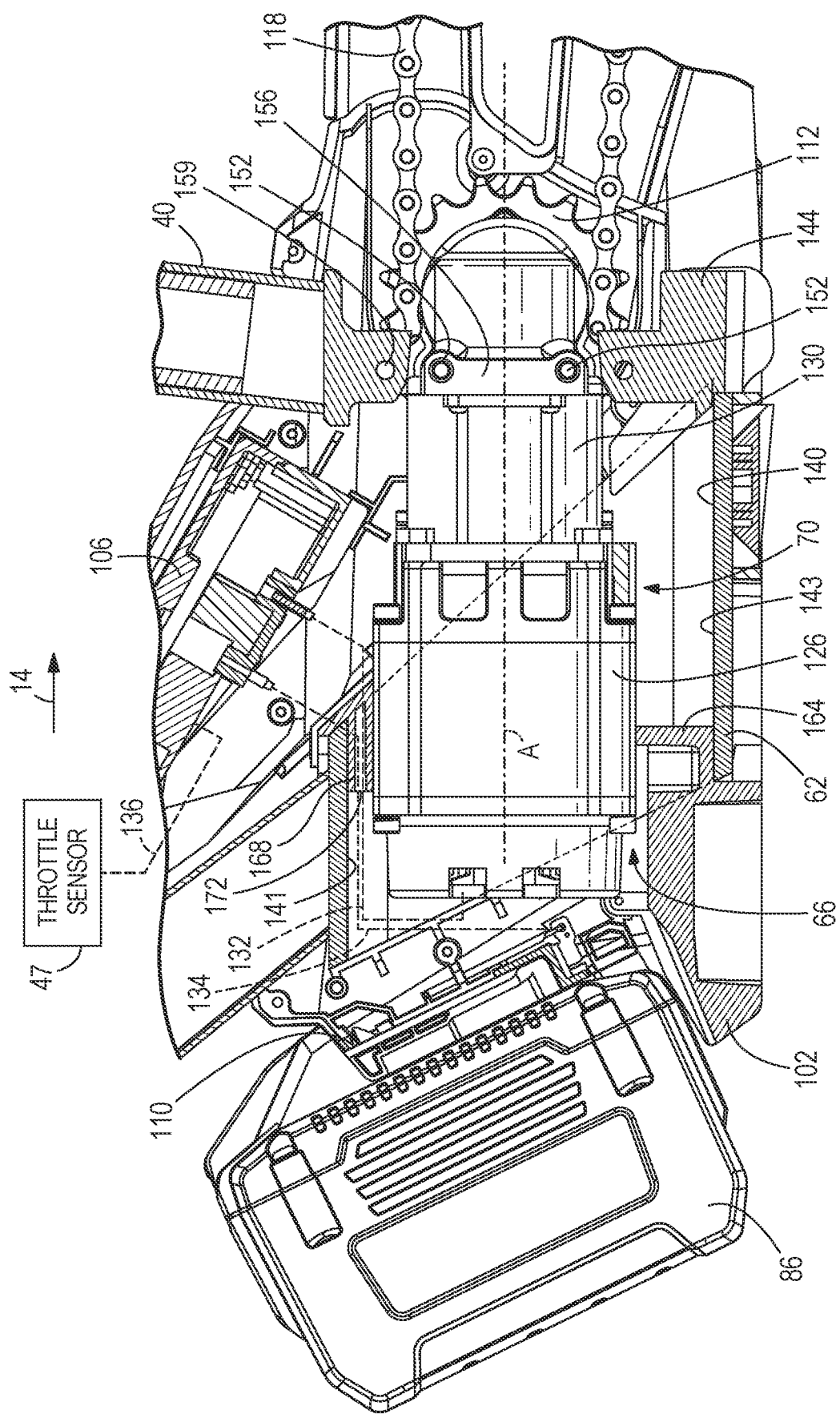
FIG. 7 is a cross-sectional side view of the running bike of FIG. 1 illustrating the drive module positioned within the drive module enclosure.
Figure 8:
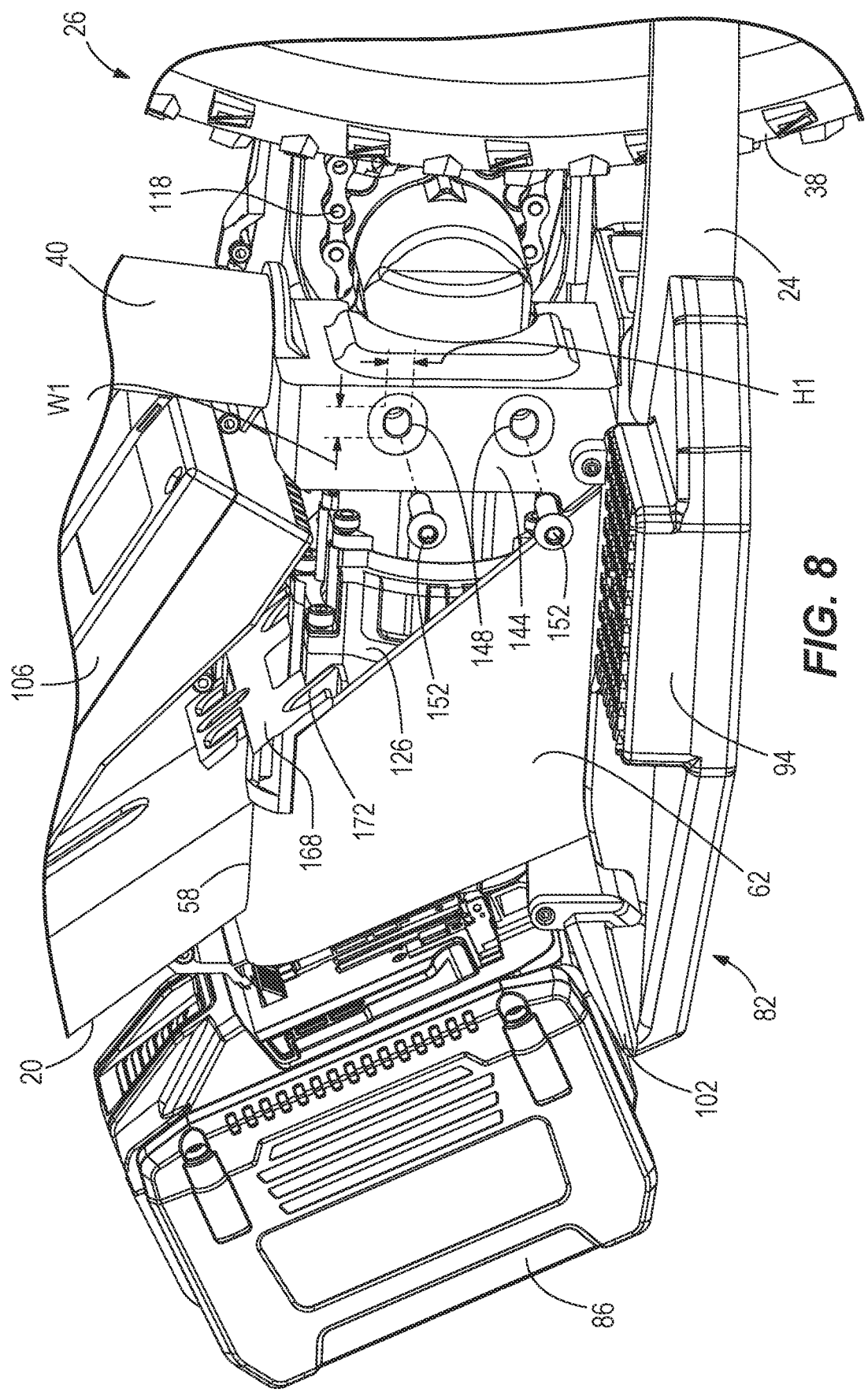
FIG. 8 is a first side view of a portion of the running bike of FIG. 1 illustrating a first set of fasteners, which secure the drive module to the frame in an exploded position.

Now with reference to FIGS. 6-8, the drive module enclosure 62 includes an inner surface 140 (FIG. 6) that supports the drive module 70 within the drive module receptacle 66. In the illustrated embodiment, the inner surface 140 is defined by a top surface 141 (FIG. 7), two opposed side surfaces 142 (FIG. 6), and a bottom surface 143 (FIG. 7). The inner surface 140, therefore, defines the drive module receptacle 66 that is open in the front-rear direction 14 and the rear-front direction 15 (in particular, only open in these two opposite directions 14, 15). In the illustrated embodiment, the side surfaces 142 are perpendicular to the adjacent top and bottom surfaces 141, 143. Thus, the drive module receptacle 66 is defined by the inner surface 140 and has a rectangular cross-sectional geometry. The rectangular cross-section geometry can include rounded corners between adjacent ones of the surfaces 141, 142, 143. Although the surfaces 141, 142, 143 are all flat, the inner surface 140 can have other combinations of surface portions, or a continuous surface around its perimeter. The frame 12 includes an attachment structure 144 spaced rearward of the drive module enclosure 62. During installation of the drive module 70, the drive module 70 is inserted within the drive module receptacle 66 in the front-rear direction 14, and the drive module 70 is coupled to the attachment structure 144 to secure the drive module 70 within the drive module enclosure 62. Although the drive module receptacle 66 partially or fully encloses the drive module 70 and may assist in positioning the drive module 70 relative to the longitudinal axis A (FIG. 8), the drive module receptacle 66 may be devoid of mounts or fasteners, leaving at least one degree of freedom for the drive module 70. In some embodiments, the drive module 70 may be inserted in the rear-front direction 15.

Figure 10:
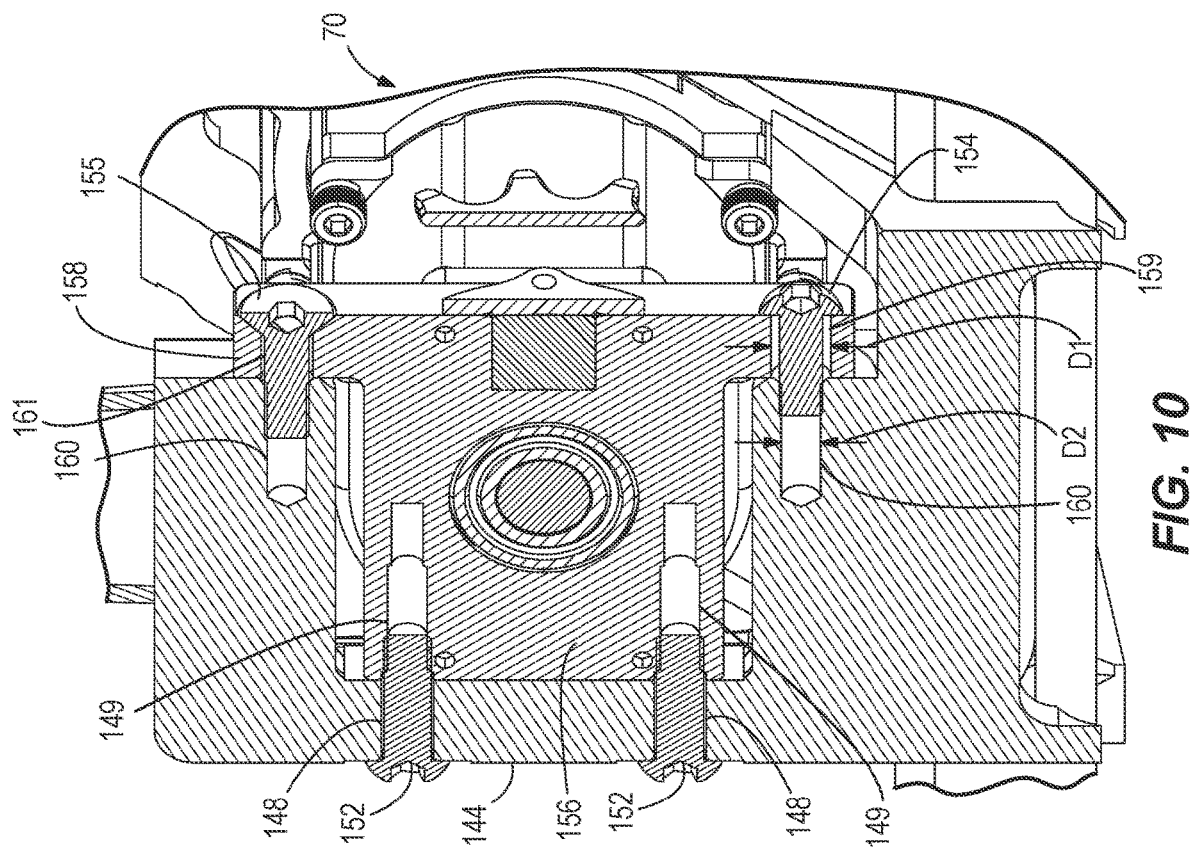
FIG. 10 is a cross-sectional view along the line 10-10 illustrating the first and second sets of fasteners securing the drive module to the frame of the running bike.

The drive module 70 is secured to the frame 12 of the bike 10 via a first pair of fasteners 154, 155 (FIGS. 6, 9, and 10) positioned on a first side (e.g., a right side) of the bike 10 and a second pair of fasteners 152 (FIGS. 8 and 10) positioned on a second, opposing side (e.g., a left side) of the bike 10. As illustrated in FIG. 10, the first pair of fasteners 154, 155 extend through apertures 159, 161 formed on the drive module 70, and are threaded into respective threaded recess 160 formed in the frame 12 (e.g., the attachment structure 144). The second pair of fasteners 152 extend through apertures 148 formed on an opposing side in the frame 12 (e.g., the attachment structure 144) and are threaded into respective threaded recesses 149 formed in the drive module 70. In the illustrated embodiments, the aperture 161 has a standard "normal" clearance size to receive a first one of the first pair of fasteners 155 (e.g., a countersunk screw such as a flat head machine screw). In the illustrated construction, the fastener 155 has a conical taper on the underside of the head for mating with a similar complementary conical taper formed at the face of the aperture 161 on the drive module 70. The remaining apertures 148, 159 are oversized such that a clearance is at least 10 percent larger than (e.g., 15 percent over) the standard "normal" clearance for the size of the fastener 152, 154. The standard "normal" fastener clearance diameter is determined by an American or international engineering organization or governing body, e.g., ASME B18.2.8. The oversized construction of the apertures 148, 159 promotes longitudinal and vertical alignment of the apertures 148, 159 with the remaining threaded recesses 149, 160 following the installation of the countersunk screw 155 in the threaded recess 160. In other words, during assembly of the bike 10, the countersunk screw 155 is threaded into the threaded recess 160 prior to installing the remaining fasteners 152, 154.

In some embodiments, the fasteners 152, 154, 155 can be M6 nominal screw size. The standard "normal" fastener clearance diameter is determined by an American or international engineering organization or governing body, e.g., ASME B18.2.8. For example, according to ASME B18, the normal fastener clearance diameter for fasteners with a M6 nominal screw size is 6.6 millimeters. In other embodiments, the fasteners 152, 154, 155 may include an alternative nominal screw size. Accordingly, the standard normal clearance size will vary according to the nominal fastener size.

In the illustrated embodiment, the attachment structure 144 (FIGS. 4 and 8) is positioned at a bottom end of the seat tube 40. As illustrated in FIGS. 8 and 10, the attachment structure 144 includes apertures 148, each of which is sized to receive a corresponding fastener 152 of the second pair of fasteners identified above. As illustrated, the attachment structure 144 may have a substantially flat outer surface and an inner surface that conforms with the geometry of the drive module 70. Further, the attachment structure 144 can be offset laterally from the longitudinal axis A as shown. The attachment structure 144 can be in the form of a mounting plate that is integral to the frame 12. The fastener(s) 152, 154, 155 can be oriented to be skew or perpendicular with respect to the longitudinal axis A. As illustrated in FIG. 10, every one of the fasteners 152, 154, 155 extends in a lateral direction toward the center of the frame 12 such that all the fasteners 152, 154, 155 are parallel and extend in various horizontal directions.

Figure 9:
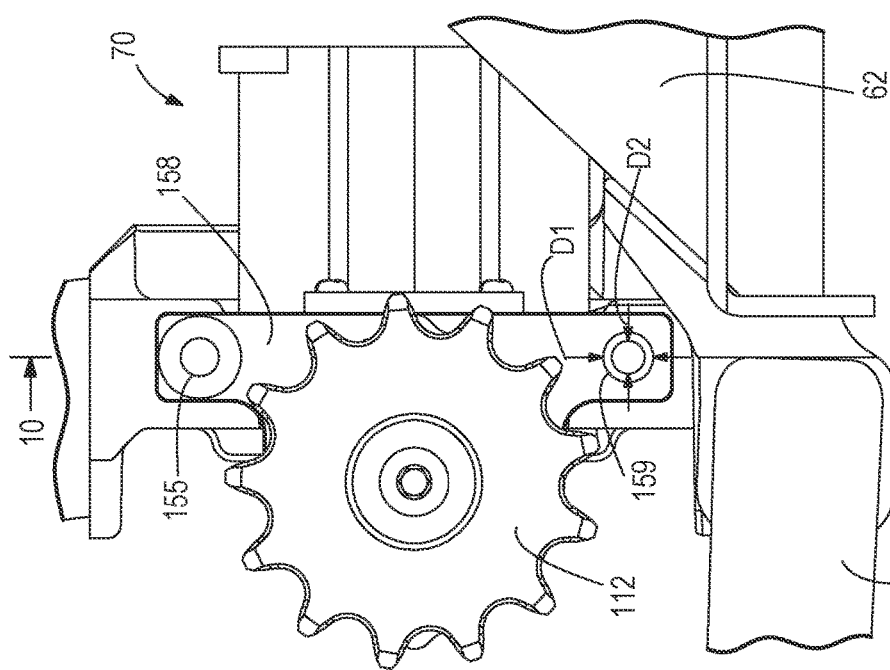
FIG. 9 is a second side view of a portion of the running bike of FIG. 1 illustrating a second set of fasteners, which secure the drive module to frame.

Now with reference to FIGS. 6, 9 and 10, the drive module 70, and more specifically the gearbox 130 in the illustrated embodiment, has a first securing structure 158. The first securing structure 158 includes the two apertures 159, 161 that are aligned with corresponding threaded recesses 160 formed on the attachment structure 144 and are sized to receive the first pair of fasteners 154, 155. The aperture 159 (e.g., bottom aperture) formed on the first securing structure 158 includes an oversized diameter D1 that is greater than the standard "normal" fastener clearance diameter determined by ASME B18.2.8 for the corresponding fastener 154. For example, the standard diameter D2 of the threaded recesses 160 for M6 fasteners is 5 millimeters and the standard clearance diameter is approximately 6.6 millimeters, which is 32 percent larger than the diameter D2 of the threaded recess 160. In the illustrated embodiment, the oversized diameter D1 of the aperture 159 is at least 50 percent larger than the diameter D2 of the threaded recess 160. In addition, the diameter D1 of the aperture 159 is approximately 15 percent larger than the standard "normal" fastener clearance diameter determined by ASME B18.28. The construction of the oversized diameter improves the ability to align the threaded recesses 160 of the attachment structure 144 and the aperture 159 of the first securing structure 158 following the engagement of the countersunk screw 155 with the recess 160. As such, the larger diameter D1 of the aperture 159 relaxes the tolerances needed during manufacturing of the drive module 70 and the attachment structure 144, which promotes longitudinal and vertical alignment of the apertures 148, 159 and the recesses 149, 160 during assembly of the running bike.

Now with reference to FIGS. 8, and 10, the attachment structure 144 includes two apertures 148 that align with the respective threaded recesses 149 (FIG. 10) formed on a second securing structure 156 of the drive module 70, and more specifically the gearbox 130 in the illustrated embodiment. The second securing structure 156 opposes the first securing structure 158 (e.g., in a left to right direction). The apertures 148 are elongated in a longitudinal direction of the bike 10 such that a width W1 (FIG. 8) of each one of the apertures 148 is greater than a height H1 thereof. For example, the widths W1 of the apertures 148 are at least 10 percent larger than the heights H1 of the apertures 148. In the illustrated embodiment, the width W1 of each aperture 148 is approximately 15 percent larger than the height H1. For example, in the illustrated embodiment, the height H1 of each aperture 148 is approximately 6.6 millimeters and the width W1 is approximately 7.6 millimeters. The elongated construction of the apertures 148 promotes longitudinal alignment of the apertures 148 of the attachment structure 144 and the threaded recesses 149 of the drive module 70 so the fasteners 152 can engage the threaded recesses 149 to secure the drive module 70 to the frame 12. As such, the elongated apertures 148 relax the tolerances needed during manufacturing of the drive module 70 and attachment structure 144 and improves the ability to longitudinally align the apertures 148 and the recesses 149. In some embodiments, the aperture 159 may be formed in a similar fashion as the elongated apertures 148. In addition, while the illustrated embodiment depicts four fasteners 152, 154, 155, it should be appreciated that more (e.g., 5, 6, etc.) or less (e.g., 2 or 3) fasteners may be used to secure the drive module 70 to the frame 12.

Now with reference to FIGS. 4 and 7, at least one alignment structure 164, 168 is positioned between the drive module 70 and the inner surface 140 of the drive module enclosure 62 to support the drive module 70 within the drive module receptacle 66. In the illustrated embodiment, a first alignment structure 164 is integrally formed with the front portion 102 of the footrest 82 and a second alignment structure 168 is positioned opposite the first alignment structure 164. The first alignment structure 164 is wedged between a bottom side of the drive module 70 and the bottom surface 143 of the receptacle 66, and the second alignment structure 168 is wedged between a top side of the drive module 70 and the top surface 141 of the receptacle 66. The first and/or second alignment structures 164, 168 may also include portions that wedge between the drive module 70 and the respective side surfaces 142 of the receptacle 66. The construction of the alignment structures 164, 168 forms a press fit engagement between the alignment structure 164, 168 and the drive module 70 so a front portion of the drive module 70 is supported within the drive module receptacle 66 without fasteners. In other words, drive module receptacle 66 consists of walls devoid of any fastener holes. The alignment structures 164, 168 also vertically align the threaded recesses 149, 160 with the apertures 148, 159. In the illustrated embodiment, the alignment structures 164, 168 are spacers that are coupled to the footrest 82 and/or the drive module enclosure 62.

The alignment structures 164, 168 restrict lateral (e.g., left to right) and vertical (e.g., up and down) movement of the drive module 70. At the same time, the fasteners 152, 154, 155 restrict movement of the drive module 70 along the longitudinal axis of the running bike 10 (e.g., in the front-rear direction 14 or the rear-front direction 15). In alternative embodiments, the alignment structures 164, 168 may be formed as a single structure or may be coupled directly to the drive module enclosure 62. In other words, it should be appreciated that the alignment structures 164, 168 may be formed in a variety of fashions that restricts lateral and/or vertical movement of the drive module 70.

Now with reference to FIGS. 6 and 7, the alignment structure 168 further includes a channel 172 positioned between the drive module 70 and the inner surface 140 of the drive module enclosure 62 so the electrical cables 132, 134 (FIG. 7) can extend through the drive module receptacle 66 to electrically connect the battery pack 86 and the drive module 70 to the electronic control module 106. For example, the first electrical cable 132 extends from the drive module 70, through the channel 172 in the drive module receptacle 66 and connects to the electronic control module 106. The second electrical cable 134 extends from the battery mount 110, through the channel 172 in the drive module receptacle 66 and connects to the electronic control module 106. As a result, the construction of the drive module enclosure 62 creates a compact arrangement of the drive module 70, the battery pack 86, and the electronic control module 106. In addition, the drive module 70 and the electronic control module 106 may be easily accessed and detached from the running bike, which improves the serviceability of the running bike.

During assembly of the running bike, the drive module 70 is inserted within the drive module receptacle 66 along the longitudinal direction of the running bike 10. For example, the drive module 70 is inserted in the front-rear direction 14 and may be moved along the longitudinal axis A of the drive module 70 in doing so. The alignment structures 164, 168 are positioned between the drive module 70 and the inner surface 140 of the drive module enclosure 62. In the illustrated embodiment, attachment of the footrest 82 to the support platforms 92 positions the first alignment structure 164 between the bottom surface 143 and the drive module 70. Following the attachment of the footrest 82, the second alignment structure 168 is positioned between a top portion of the drive module 70 and the top surface 141 of the drive module enclosure 62. In the illustrated embodiment, the drive module 70 is press fit into engagement with the alignment structures 164, 168 to support the drive module 70 within the drive module receptacle 66 such that the drive module 70 has only a single degree of freedom, which is the ability to translate along the longitudinal axis A. The drive module 70 is translated in the front-rear direction 14 along this one degree of freedom until reaching a longitudinal position in which a portion of the drive module 70 aligns with the attachment structure 144. For example, the first securing structure 156 of the drive module 70 is secured to the attachment structure 144 via the fasteners 154, 155 and the second securing structure 154 of the drive module 70 is secured to the attachment structure 144 via the fastener(s) 152. In the illustrated embodiment, the countersunk screw 155 is threaded into the threaded recess 160 prior to securing the remaining fasteners 152, 154. Once the drive module 70 is secured, the side panels 88, 90 are secured to the frame 12 (e.g., via engagement with the footrest 82) to form the battery mount 110. While the illustrated embodiment allows the drive module 70 to inserted in the front-rear direction 14, it should be appreciated that the drive module may also be inserted in the rear-front direction 15. In such an embodiment, a portion of the drive module 70 may extend beyond a front end of the of the drive module enclosure 62 in a similar fashion as the drive module 70. In other embodiment, the front portion of the drive module enclosure 62 may be partly or fully closed so the drive module receptacle 66 is only open in the rear-front direction 15.

In some embodiments, the drive module 70 may be removed from the drive module enclosure and replaced with an alternative drive module, for example after the bike 10 is put into service. To remove the drive module 70, the side panels 88, 90 are disconnected from the frame 12, and the fasteners 152, 154, 155 (FIG. 10) are disengaged from securing structures 156, 158 of the drive module 70. The drive module 70 may be urged out of engagement with the alignment structures 164, 168 so the drive module 70 can be removed towards the front end 18 of the running bike 10. Once the drive module 70 is removed, an alternative drive module may be positioned within the drive module enclosure 62 as described above to complete a repair or upgrade to the bike 10.

Various aspects of the invention are set forth in the following claims.

What is claimed is:

1. A bike configured for travel along a longitudinal direction, the bike comprising:
    a frame elongated in the longitudinal direction;
    a front fork rotatably engaged with a front wheel at a front end of the bike;
    a rear fork rotatably engaged with a rear wheel at a rear end of the bike;
    a handlebar supported with the front fork for rotation at the front end of the bike for steering the bike; and
    a drive module configured to drive the rear wheel of the bike when operated selectively with power,
    wherein the frame includes:
        a down tube extending downward and rearward from the front end of the bike, the down tube having a first end positioned proximate the front end of the bike and a second end opposite the first end, and
        a drive module enclosure formed at the second end of the down tube, the drive module enclosure including an inner surface defining a drive module receptacle to receive the drive module, and
    an alignment structure wedged between the drive module and the inner surface of the drive module enclosure to support the drive module within the drive module receptacle,
    wherein the drive module is positioned within the drive module receptacle to form an engagement between the alignment structure and the drive module to support a first portion of the drive module within the drive module receptacle.

2. The bike of claim 1, wherein the drive module receptacle is devoid of a mount or a fastener so the drive module has at least one degree of freedom within the drive module receptacle.

3. The bike of claim 1, further comprising an attachment structure spaced rearward of the drive module enclosure, and wherein a second portion of the drive module is coupled to the attachment structure to secure the drive module within the drive module receptacle.

4. The bike of claim 3, further comprising a head tube, a top tube extending rearward from the head tube, and a seat tube connected to the top tube, wherein the attachment structure is positioned at a bottom end of the seat tube.

5. The bike of claim 3, further comprising:
    a threaded recess formed on one of the drive module and the attachment structure;
    an elongated aperture formed on the other one of the attachment structure and the drive module, the elongated aperture having a width extending in the longitudinal direction of the bike and a height extending in a vertical direction of the bike, the width of the elongated aperture being at least 10 percent larger than the height of the elongated aperture to promote longitudinal alignment of the elongated aperture and the threaded recess, and
    a fastener sized to extend through the elongated aperture and engage with the threaded recess to secure the drive module to the frame of the bike.

6. The bike of claim 3, further comprising:
    an aperture formed in one of the attachment structure and the drive module, the aperture having a first diameter;
    a threaded recess formed on the other one of the attachment structure and the drive module, the threaded recess having a second diameter, the first diameter of the aperture being at least 50 percent larger than the second diameter of the threaded recess to promote longitudinal or vertical alignment of the aperture and the threaded recess; and
    a fastener sized to extend through the aperture and engage with the threaded recess to secure the drive module to the frame of the bike.

7. The bike of claim 1, wherein the inner surface of the drive module enclosure is defined by a top surface, side surfaces, and a bottom surface such that the drive module receptacle is open in both a front-rear direction and a rear-front direction.

8. A bike configured for travel along a longitudinal direction, the bike comprising:
    a frame elongated in the longitudinal direction;
    a front fork rotatably engaged with a front wheel at a front end of the bike;
    a rear fork rotatably engaged with a rear wheel at a rear end of the bike;
    a handlebar supported with the front fork for rotation at the front end of the bike for steering the bike;
    a footrest; and
    a drive module configured to drive the rear wheel of the bike when operated selectively with power,
    wherein the frame includes:
        a down tube extending downward and rearward from the front end of the bike, the down tube having a first end positioned proximate the front end of the bike and a second end opposite the first end, and
        a drive module enclosure formed at the second end of the down tube, the drive module enclosure including an inner surface defining a drive module receptacle to receive the drive module, and an alignment structure positioned between the drive module and the inner surface of the drive module enclosure to support the drive module within the drive module receptacle, wherein the drive module is positioned within the drive module receptacle to form an engagement between the alignment structure and the drive module to support a first portion of the drive module within the drive module receptacle, wherein the footrest is connected to and supported by the frame adjacent the second end of the down tube, and wherein the alignment structure is integrally formed with the footrest to support the drive module within the drive module enclosure and restrict lateral or vertical movement of the drive module.

9. A bike configured for travel along a longitudinal direction, the bike comprising:
a frame elongated in the longitudinal direction;
a front fork rotatably engaged with a front wheel at a front end of the bike;
a rear fork rotatably engaged with a rear wheel at a rear end of the bike;
a handlebar supported with the front fork for rotation at the front end of the bike for steering the bike;
a drive module configured to drive the rear wheel of the bike when operated selectively with power, the drive module having a securing structure; and
an alignment structure,
wherein the frame includes:
a down tube extending downward and rearward from the front end of the bike, the down tube having a first end positioned proximate the front end of the bike and a second end opposite the first end,
a drive module enclosure formed at the second end of the down tube, the drive module enclosure defining a drive module receptacle to receive the drive module, and
an attachment structure positioned outside of the drive module enclosure, and
a fastener coupling the drive module to the attachment structure to secure the drive module within the drive module receptacle,
wherein the alignment structure is positioned between the drive module and an inner surface of the drive module enclosure to support the drive module within the drive module receptacle, and wherein the drive module is positioned within the drive module receptacle to form an engagement between the alignment structure and the drive module to support a first portion of the drive module within the drive module receptacle without fasteners.

10. The bike of claim 9, wherein the drive module receptacle is devoid of a mount or a fastener so the drive module has at least one degree of freedom prior to being secured to the attachment secure by the fastener.

11. The bike of claim 9, wherein the attachment structure is spaced rearward of the drive module enclosure.

12. The bike of claim 11, further comprising a head tube, a top tube extending rearward from the head tube, and a seat tube connected to the top tube, wherein the attachment structure is positioned at a bottom end of the seat tube.

13. The bike of claim 9, further comprising:
a threaded recess formed on one of the drive module and the attachment structure; and
an elongated aperture formed on the other one of the attachment structure and the drive module, the elongated aperture having a width extending in the longitudinal direction of the bike and a height extending in a vertical direction of the bike, the width of the elongated aperture being at least 10 percent larger than the height of the elongated aperture to promote longitudinal alignment of the elongated aperture and the threaded recess, and
wherein the fastener sized to extend through the elongated aperture and engage with the threaded recess to secure the drive module to the frame of the bike.

14. The bike of claim 9, further comprising:
an aperture formed in one of the attachment structure and the drive module, the aperture having a first diameter; and
a threaded recess formed on the other one of the attachment structure and the drive module, the threaded recess having a second diameter, the first diameter of the aperture being at least 50 percent larger than the second diameter of the threaded recess to promote longitudinal or vertical alignment of the aperture and the threaded recess, and
wherein the fastener is sized to extend through the aperture and engage with the threaded recess to secure the drive module to the frame of the bike.

15. A bike configured for travel along a longitudinal direction, the bike comprising:
a frame elongated in the longitudinal direction;
a front fork rotatably engaged with a front wheel at a front end of the bike;
a rear fork rotatably engaged with a rear wheel at a rear end of the bike;
a handlebar supported with the front fork for rotation at the front end of the bike for steering the bike;
a drive module configured to drive the rear wheel of the bike when operated selectively with power; and
an alignment structure,
wherein the frame includes:
a down tube extending downward and rearward from the front end of the bike, the down tube having a first end positioned proximate the front end of the bike and a second end opposite the first end, and
a drive module enclosure formed at the second end of the down tube, the drive module enclosure including an inner surface defining a drive module receptacle to receive the drive module,
wherein the drive module includes a portion positioned within the drive module receptacle and a securing structure positioned outside the drive module receptacle,
wherein the securing structure is configured to couple the drive module to the frame, and
wherein the alignment structure is positioned between the drive module and the inner surface of the drive module enclosure to support the drive module within the drive module receptacle, and wherein the drive module is positioned within the drive module receptacle to form an engagement between the alignment structure and the drive module to support the first portion of the drive module within the drive module receptacle without fasteners.

16. The bike of claim 15, wherein the drive module receptacle is devoid of a mount or a fastener so the drive module has at least one degree of freedom within the drive module receptacle.

17. The bike of claim 15, further comprising a head tube, a top tube extending rearward from the head tube, and a seat tube connected to the top tube, wherein the securing structure is coupled to a bottom end of the seat tube.

18. The bike of claim 15, further comprising:
a threaded recess formed on one of the drive module and the frame; and
an aperture formed on the other one of the frame and the drive module, and
wherein a fastener sized to extend through the aperture and engage with the threaded recess to secure the drive module to the frame of the bike.

\* \* \* \* \*